R. SCHILLING.
APPARATUS FOR REMOVING FAT FROM EFFLUENTS.
APPLICATION FILED FEB. 12, 1910.
975,081.
Patented Nov. 8, 1910.
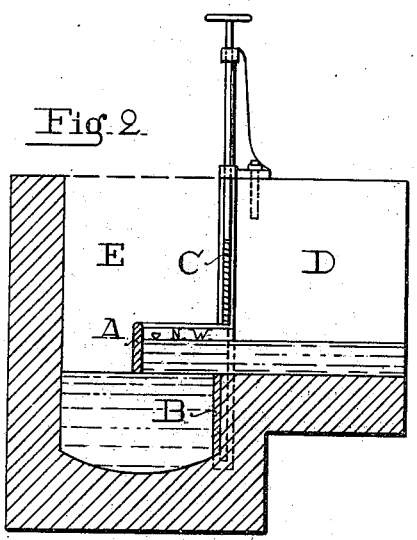
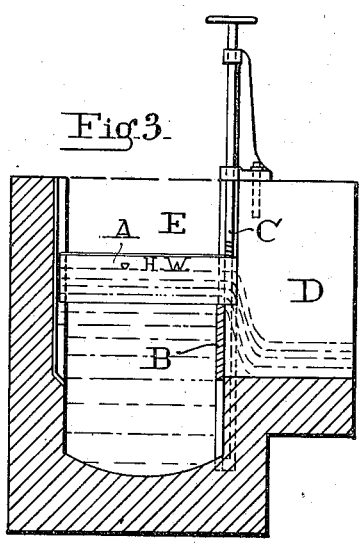
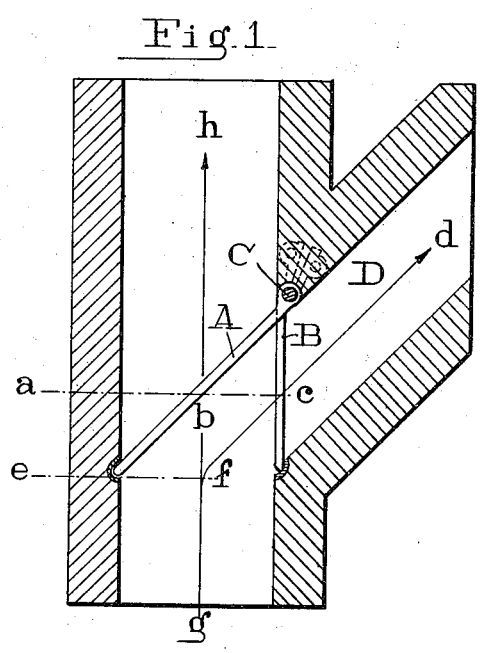
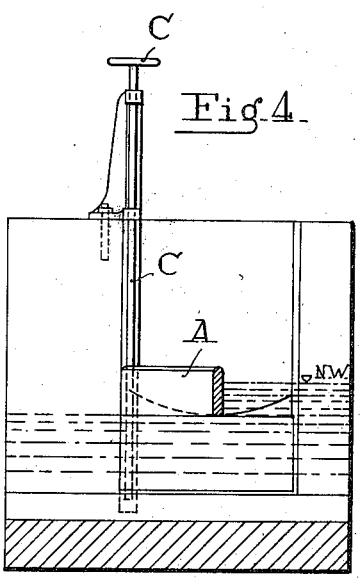
Witnesses:
James P. Mansfield.
G. M. Copenhaver.
Inventor:
Rudolf Schilling.
By:
Alexander & Dowell
Attorneys

UNITED STATES PATENT OFFICE.

RUDOLF SCHILLING, OF DAHLEM, NEAR BERLIN, GERMANY.

APPARATUS FOR REMOVING FAT FROM EFFLUENTS.

975,081.

Specification of Letters Patent.  Patented Nov. 8, 1910.

Application filed February 12, 1910. Serial No. 543,453.

*To all whom it may concern:*

Be it known that I, RUDOLF SCHILLING, a subject of the German Emperor, and residing at Dahlem, near Berlin, Germany, have invented certain new and useful Improvements in Apparatus for Removing Fat from Effluents, of which the following is a specification.

My invention relates to apparatus for removing fat from effluents.

In order to separate fat from waste waters and effluents, the upper layers containing fat have been separated from the lower layers containing sediment and the former have been subjected to treatment for removing the fat. To this end, the layers containing fat were conducted into a channel branching off from the main channel.

The accompanying drawing shows one illustrative embodiment of my apparatus.

In said drawing:—Figure 1 is a plan showing a branch channel provided with deflector and weir, Fig. 2 is a vertical section on the bent line a, b, c, d, in Fig. 1, Fig. 3 is a like view on the line e, f, b, c, d, in Fig. 1 at a different water-level, and Fig. 4 is a vertical longitudinal section in the plane g, h in Fig. 1.

Referring to the drawing, the deflector A and the gate or weir B can be moved by spindle C. The deflector A is arranged transversely in the main channel E rearwardly of the discharge outlet D in the direction of flow of the effluent. The gate B closes the part of the outlet D below deflector A.

The position of deflector A relatively to the gate D is regulated corresponding to the height of the fat-containing layer in the effluent in such manner that it is guaranteed that this layer is deflected as completely as possible into the branch channel D.

I claim:—

1. In apparatus for removing fat-containing layers of liquid from effluents, the combination, with a main channel having a branch channel therefrom, of a vertically-adjustable deflector arranged transversely of the main channel at the branch channel, and a vertically-adjustable gate at the junction of the branch channel with the main channel closing part of the branch channel below the deflector.

2. In apparatus for removing fat-containing layers of liquid from effluents, the combination, with a main channel having a branch channel therefrom, of a vertically-adjustable deflector arranged transversely of the main channel at the branch channel, a vertically-adjustable gate at the junction of the branch channel with the main channel closing part of the branch channel below the deflector, and means for simultaneously adjusting the elevation of said deflector and gate.

In testimony whereof, I affix my signature in the presence of two witnesses.

RUDOLF SCHILLING.

Witnesses:
 JEAN GRUND,
 ERWIN DIPPEL.